Oct. 18, 1938. L. B. JOHNSON Re. 20,886

LOAD TRANSFER DEVICE FOR ROADWAYS

Original Filed April 15, 1937

Inventor
Louis B. Johnson.

By A. M. Bunn
Attorney

Reissued Oct. 18, 1938

Re. 20,886

UNITED STATES PATENT OFFICE 20,886

LOAD TRANSFER DEVICE FOR ROADWAYS

Louis B. Johnson, Baltimore, Md., assignor to Dow-Weld Company, Inc., a corporation of Maryland Original No. 2,104,866, dated January 11, 1938, Serial No. 137,114, April 15, 1937. Application for reissue June 14, 1938, Serial No. 214,053

12 Claims. (Cl. 94—18)

This invention relates to joint forming means to be used in roadways, pavements and the like, and more particularly to a load-transfer device for concrete roadways for permitting the concrete slabs forming the roadway to expand and contract.

One of the objects of the invention is the construction of a dowel assembly to be used in conjunction with the expansion joint or expansion material in a concrete roadway, said assembly serving to hold its dowels parallel to each other and likewise parallel to the finished grade.

Another purpose is the formation of a dowel assembly to be used in conjunction with an expansion joint or expansion material in a concrete roadway, said assembly having an angle member forming a continuous bearing support for the joint throughout its entire length and serving to prevent the overturning or depression of the joint.

Still a further aim is the building of a dowel assembly of the character above specified and in which the dowels of the assembly are rigidly fixed with respect to each other permitting the deposition of concrete over the joint and dowels and yet holding the joint in perfect alignment at all times.

Other aims and objects will be apparent to those skilled in the art from the description of the invention hereinafter appearing when read in conjunction with the appended drawing forming a part hereof to which reference is now made in which:—

Figure 2:
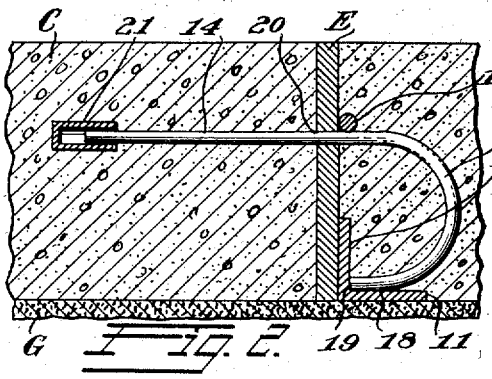
Fig. 2 is a view partly in section and partly in elevation, showing the manner of mounting the dowel assembly in a concrete roadway and its relationship to an expansion joint normally positioned between adjacent slabs of the roadway.
Figure 3:
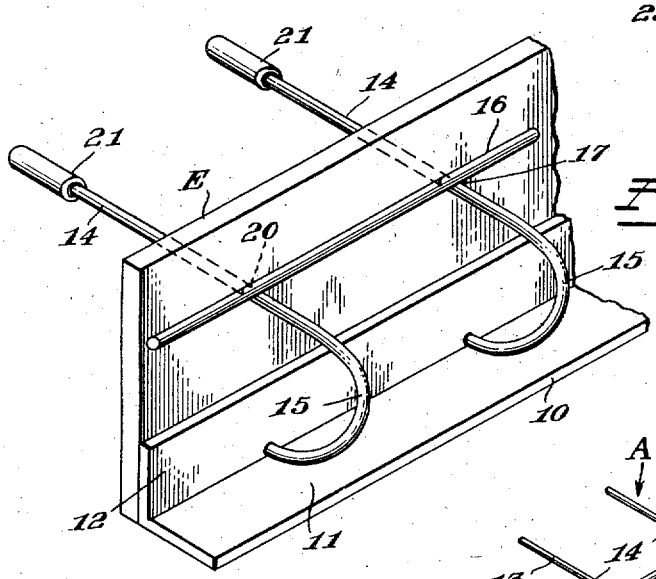
Fig. 3 is an enlarged perspective view, partly broken away, showing the relationship between the expansion joint and its dowel assembly.
Figure 1:
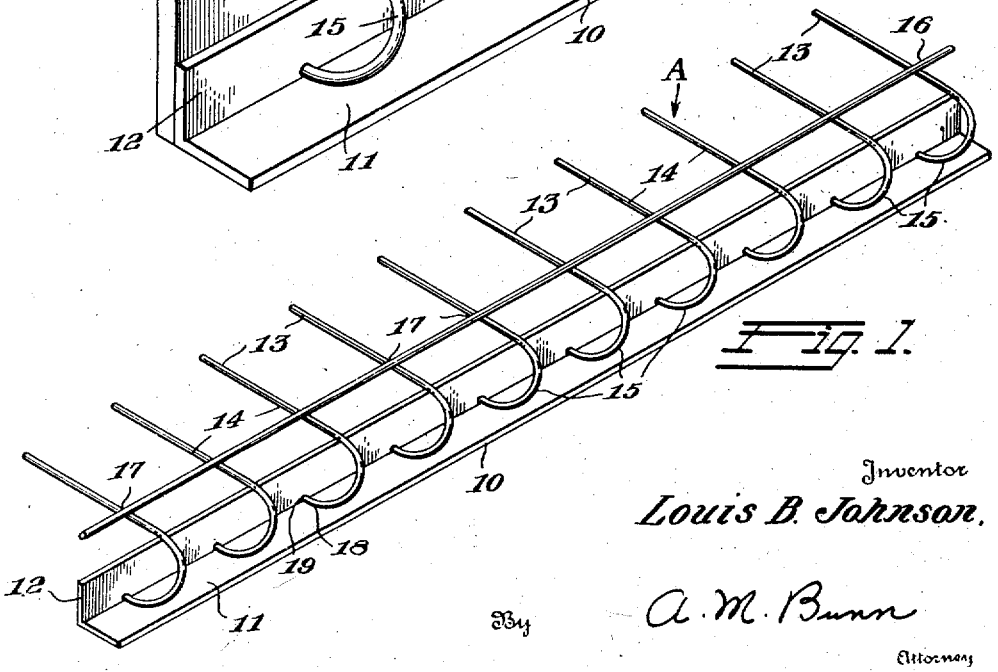
Fig. 1 is a perspective view of the novel dowel assembly prior to its insertion in a concrete pavement or roadway and showing the manner in which the dowels are connected to each other and to an angular supporting bearing member.

Referring first to Figures 1 to 3, inclusive, the dowel assembly is generally designated as A and is shown as comprising an elongated supporting member 10, in the form of an angle iron, said angle iron or member having a horizontal portion 11 and a vertical portion 12 at right angles thereto. By the use of the term horizontal and vertical to describe the portions 11 and 12 respectively, of said angle iron member 10, it will be understood that this defines the respective operative positions of these portions when the assembly A is set in a roadway for use in conjunction with an expansion joint, indicated on the drawing as E.

The reference numeral 13 designates a series of similar dowel pins or bars, each characterized by a horizontal section 14 and a downwardly extending curved section 15, projecting from said horizontal section 14. It is preferred to construct each dowel 13 of a single piece of three-quarter inch metal of circular cross-section, although various other thicknesses may be employed. A transverse bar 16 is welded as at 17 to all of the dowel bars 13 to hold the latter in alignment in equidistantly spaced parallel vertical planes. The lowermost portion or end of the hooked-shaped or curved section 15 of each bar 13 is rigidly connected, preferably by welding, as at points 18 and 19, to the horizontal and vertical portions of the angle member 10. By reference to Fig. 2 of the drawing it will be seen that the transverse bar 16 is in spaced relation to the vertical portion 12 of the angle member 10 and in the same vertical plane therewith. The purpose of this construction will be shortly described.

In the building of a roadway the sub-grade G is first prepared to provide a suitable foundation, and the dowel assembly A is then positioned thereon with the vertical portion 12 of the angle iron of said assembly normal to the upper surface thereof. The expansion joint E is provided with spaced apertures 20 through which the horizontal sections 14 of the dowels 13 pass, as will be seen by reference to Fig. 3 of the drawing. Loosely positioned over the outer end of each of said sections 14 is a tubular expansion sleeve 21 for a purpose to be shortly described.

By virtue of the fact that the rod 16 is in the same vertical plane as the portion 12 of the angle iron 10, the expansion joint E is properly positioned in a vertical plane when it is moved into contact with one face 12 of the angle iron 10 and with the horizontal rod 16, as will be seen from an inspection of Fig. 2 of the drawing. The expansion joint E and the entire dowel assembly A are preferably held in this position by any suitable means while the concrete C is poured to form concrete slabs on both sides of the joint E. The tubular expansion sleeve 21, rigidly held in position by the concrete, loosely receives the free end of the section 14 of each dowel 13 to allow expansion and contraction thereof. This will also be seen by reference to Fig. 2 of the drawing.

Figure 4:
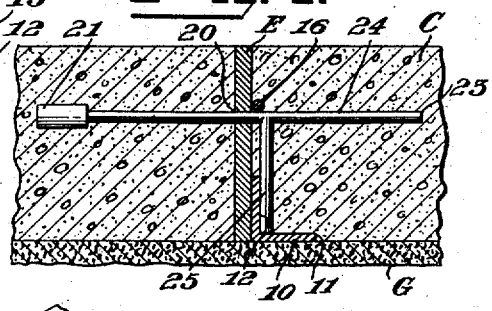
Fig. 4 is a view similar to that of Figure 2, but showing a modified type of dowel bar.

In the modified form of the invention shown in Fig. 4 of the drawing, the dowel bar 23 is characterized by a horizontal portion 24 and a vertical portion 25 at right angles to said horizontal portion and intermediate the ends thereof, forming in effect a T-shaped dowel. The vertical portion 25 is welded to the angle member 10 in a manner similar to that described with reference to the preferred embodiment of the invention shown in Figs. 1 to 3 inclusive. It will also be understood that there are a plurality of T-shaped dowels 23 corresponding to dowels 13, a rod or bar 16 welded to said dowels 23, and the principles of the invention and other details of construction are the same in both the preferred embodiment of the invention and in the modified form of Figure 4.

From the foregoing description, it will now be apparent that the dowels will always be held parallel to each other and to the finished grade; that the angle member forms a continuous support or prop for the expansion joint and serves to prevent the overturning thereof. Also it will be understood that in lieu of a preformed joint, a joint may be built up to extend above the sub-grade and that the dowel assembly serves to maintain the joint normal to the roadway bed and grade. While it is preferred to weld the dowels to the angle member other forms of connecting the same may be employed.

Obviously the invention is susceptible to more or less modification than what has been shown and described, and desirable changes may suggest themselves to those skilled in the art without departing from the spirit of the invention. It is contemplated to cover all such modification and to be limited in this respect only as may be necessary by the claims hereto appended.

I claim:—

1. A load-transfer device for roadways comprising a supporting member having horizontal and vertical flanges, a plurality of dowels positioned at spaced intervals extending above said member and transversely thereof, said dowels each having a vertical extension rigidly connected to said member.

2. A load-transfer device for roadways comprising a supporting member having horizontal and vertical flanges, a plurality of dowels positioned at spaced intervals extending above said member and transversely thereof, each of said dowels having an integral vertical extension welded to the horizontal and vertical flanges of said supporting member.

3. A load-transfer device for roadways comprising a supporting member having horizontal and vertical flanges, a plurality of dowels positioned at spaced intervals extending above said member and transversely thereof, each of said dowels having an integral vertical extension welded to the horizontal and vertical flanges of said supporting member, and means connected to all of said dowels for maintaining same and said supporting member as a rigid unit.

4. A load-transfer device for roadways comprising an angle member having horizontal and vertical flanges, a plurality of dowels having a horizontal portion and a downwardly extending vertical portion at one end thereof, said horizontal portions extending at spaced intervals in a single horizontal plane above and transversely of said angle member, said vertical portions being rigidly secured to said flanges, and a rod secured to all of the horizontal portions of said dowels.

5. A load-transfer device for roadways comprising a supporting member having horizontal and vertical flanges, a plurality of dowels positioned at spaced intervals extending above said member and transversely thereof, said dowels each having a downwardly projecting extension rigidly connected to said member.

6. A load-transfer device for roadways comprising a supporting member having horizontal and vertical flanges, a plurality of dowels positioned at spaced intervals extending above said member and transversely thereof, each of said dowels having an integral downwardly projecting extension welded to the horizontal and vertical flanges of said supporting member.

7. A load-transfer device for roadways comprising a supporting member having horizontal and vertical flanges, a plurality of dowels positioned at spaced intervals extending above said member and transversely thereof, each of said dowels having an integral downwardly projecting extension welded to the horizontal and vertical flanges of said supporting member, and means connected to all of said dowels for maintaining same and said supporting member as a rigid unit.

8. A load-transfer device for roadways comprising an angle member having horizontal and vertical flanges, a plurality of dowels having a horizontal portion and a downwardly extending portion at one end thereof, said horizontal portions extending at spaced intervals in a single horizontal plane above and transversely of said angle member, said downwardly extending portions being rigidly secured to said flanges, and a rod secured to all of the horizontal portions of said dowels.

9. A load-transfer device for roadways comprising a supporting member, a plurality of dowels each having a straight portion and a curved extension of said straight portion, the straight portions of all of said dowels at spaced intervals extending transversely of and above said supporting member, each of said curved extensions being rigidly connected to said member.

10. A load-transfer device for roadways comprising a supporting member, a plurality of dowels each having a straight portion and a curved extension of said straight portion, the straight portions of all of said dowels at spaced intervals extending transversely of and above said supporting member, each of said curved extensions being rigidly connected to said member, and means secured to the upper surface of all of said dowels connecting same together.

11. A load-transfer device for roadways comprising a supporting member, a plurality of dowels each having a straight portion and a curved extension of said straight portion, the straight portions of all of said dowels at spaced intervals extending transversely of and above said supporting member, each of said curved extensions being rigidly connected to said member, and a rod secured to the upper surface of all of said dowels.

12. A load-transfer device for roadways comprising a supporting member, a plurality of dowels each having a straight portion and a curved extension of said straight portion, the straight portions of all of said dowels at spaced intervals extending transversely of and above said supporting member, each of said curved extensions being rigidly connected to said member, and a rod welded to the upper surface of said dowels.

LOUIS B. JOHNSON.